United States Patent
Olbrich et al.

(10) Patent No.: US 6,752,918 B1
(45) Date of Patent: Jun. 22, 2004

(54) METHOD FOR PRODUCING NICKEL HYDROXIDES

(75) Inventors: Armin Olbrich, Seesen (DE); Viktor Stoller, Bad Harzburg (DE); Juliane Meese-Marktscheffel, Goslar (DE); Frank Schrumpf, Goslar (DE); Josef Schmoll, Goslar (DE); Gerhard Gille, Goslar (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 10/009,543
(22) PCT Filed: Apr. 25, 2000
(86) PCT No.: PCT/EP00/03684
§ 371 (c)(1),
(2), (4) Date: Nov. 5, 2001
(87) PCT Pub. No.: WO00/68462
PCT Pub. Date: Nov. 16, 2000

(30) Foreign Application Priority Data

May 7, 1999 (DE) .......................... 199 21 313

(51) Int. Cl.$^7$ ................................ C25B 1/00
(52) U.S. Cl. ....................... 205/509; 205/508
(58) Field of Search ................. 205/509, 508

(56) References Cited

U.S. PATENT DOCUMENTS

| | | | |
|---|---|---|---|
| 4,540,476 A | * | 9/1985 | Dyer |
| 5,391,265 A | * | 2/1995 | Krynitz et al. |
| 5,660,709 A | * | 8/1997 | Bauer et al. ............ 205/344 |

FOREIGN PATENT DOCUMENTS

| | | |
|---|---|---|
| CA | 2149857 | 11/1995 |
| EP | 0801431 A | 10/1997 |
| EP | 0848439 | 6/1998 |
| EP | 1044927 A | 10/2000 |
| JP | 56-143671 | 11/1981 |
| WO | 95/33084 | 12/1995 |

OTHER PUBLICATIONS

Delmas, C. et al., "Nickel Hydroxide and Derived Phases Obtained by Chimie Douce From NaNiO$_2$ Solid State Ionics," North Holland Pub. Company. Amsterdam, NL, Bd. 32/33, Nr. Part 1, Feb. 1, 1989, Seite 104–111, XP000135205 ISSN: 0167–2738 * Seite 105–110; Abbildungen 2,3,6 *.

Allmann, R: "Doppelschichtstrukturen mit brucitähnlichen Schichtionen" CHIMA, AARAU, CH, Bd. 24, März 1970 (Mar. 1970), Seiten 99–108, XP002101576 ISSN: 009–4293 * Seite 99–101; Tabellen 1–3 *.

Chemical Abstracts, vol. 132, No. 20, May 15, 2000, Columbus, Ohio, US, abstract No. 270972.

Yang, Changchun et al; "Preparation of nickel hydroxide by electrolysis", XP002149887 & CN 1 210 153 A (Zhengzhou University, Peop. Rep. China) Mar. 10, 1999.

* cited by examiner

Primary Examiner—Arun S. Phasge
(74) Attorney, Agent, or Firm—Godfried R. Akorli; Diderico van Eyl

(57) ABSTRACT

A process is described for the production of spherical nickel hydroxide by anodic dissolution of a nickel electrode and precipitation of nickel hydroxide in a completely intermixed electrolysis cell, wherein an electrolysis brine is used which has a content of 20 to 50 g/l of chloride ions and 1 to 7 g/l of ammonia with a pH value of 9.5 to 11.5 and a temperature of 45 to 60° C.

10 Claims, 4 Drawing Sheets

Fig 4
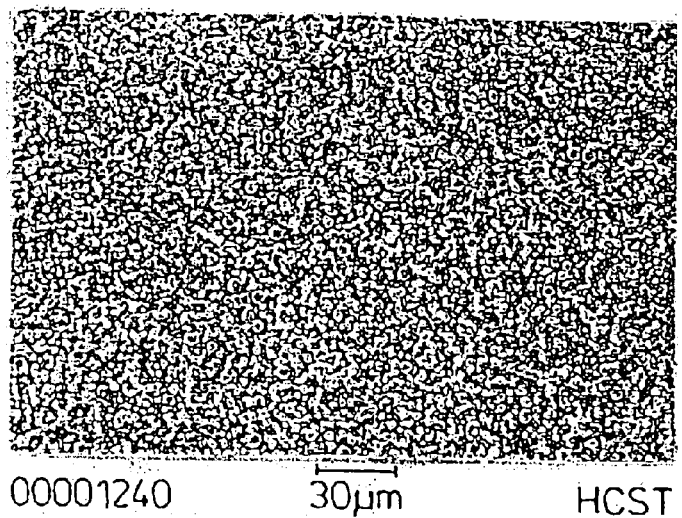
00001240   30μm   HCST
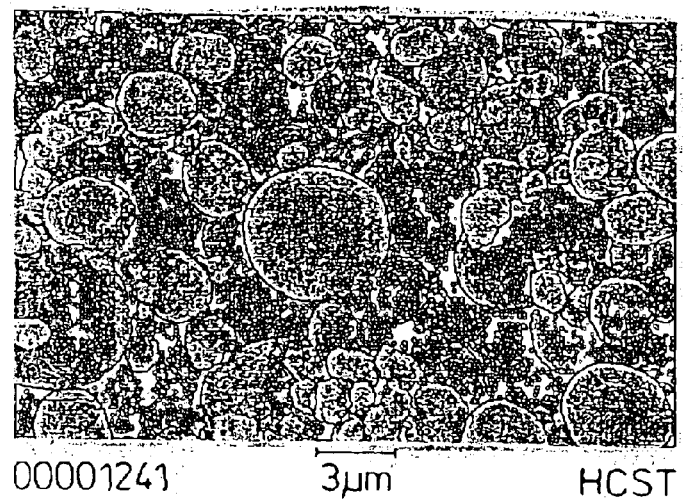
00001241   3μm   HCST
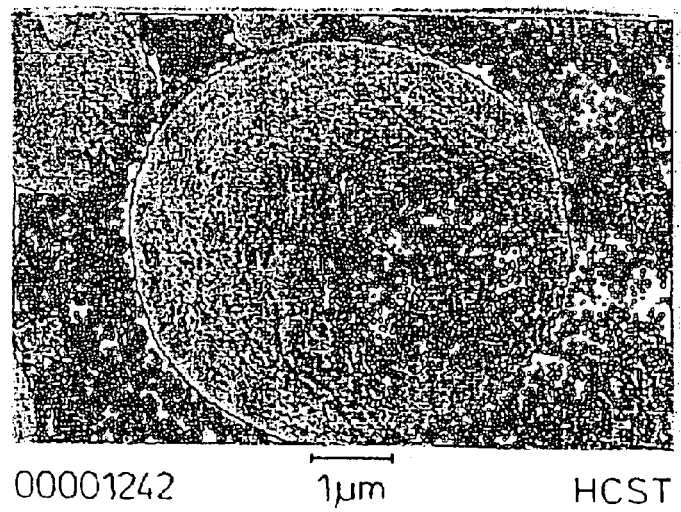
00001242   1μm   HCST

METHOD FOR PRODUCING NICKEL HYDROXIDES

This application is the National Stage Application of PCT/EP00/03684, filed on Apr. 25, 2000 which claims a priority from German Application 199 21 313.5, filed May 7, 1999.

BACKGROUND

This invention relates to a process for the production of nickel hydroxides by anodic dissolution of metallic nickel in an electrolysis cell with completely intermixed electrolysis brine.

Two processes are in particular known for the production of nickel hydroxides, namely chemical precipitation of the hydroxides from nickel salt solutions by addition of alkali metal hydroxide solutions and, secondly, anodic dissolution of nickel in an electrolysis cell, wherein hydrogen is liberated at the cathode providing the corresponding hydroxide ions.

The chemical precipitation process has the disadvantage that the neutral salts produced in stoichiometric quantities from the neutralisation reaction must be disposed of or worked up. In contrast, in electrolytic processes, it is largely possible to circulate the brine containing conductive salts by separating the precipitated hydroxide, such that the formation of secondary and waste products may largely be avoided. At least in theory, electrolytic processes should give rise to more uniform products due to the lower concentrations of the reaction partners in the precipitation suspension (electrolysis brine). However, electrolytic processes do disadvantageously exhibit a tendency towards forming anodic and/or cathodic deposits or deposits on optionally present diaphragms or membranes due to the great variations in concentration, potential and/or pH values prevailing at the corresponding boundary layers, so hindering the establishment and maintenance of process conditions which are optimal with regard to product properties or which even prevent the electrolysis from being operated at equilibrium.

It is furthermore known, for example from Japanese published patent application 56-143 671 dated 9 Nov. 1981, to produce denser nickel hydroxide powders by performing chemical precipitation from aqueous solutions of nickel ammine complex salts from which nickel hydroxide precipitates at a substantially reduced precipitation rate, such that a denser particle structure is formed Moreover, the modified crystallisation/solution equilibrium brought about by the presence of ammonia in the precipitation solution favours the formation of spheroidal agglomerates.

If the complexing agent is used in the electrolytic process, the process may be disrupted as Ni(II) in Ni(II) ammine complexes is more readily cathodically reduced than in the Ni(II) hexaaquo complex ion. The precipitated Ni forms loose deposits on the cathode. This problem is remedied according to EP-A684 324 by dividing the electrolysis cell into an anode compartment and a cathode compartment by means of a membrane permeable to hydroxide ions. In order to avoid the formation of nickel hydroxide deposits both on the membrane and on the anode, it is necessary in this process to use very high ammonia concentrations, such that the hydroxide precipitates with an increase in temperature only once it has left the reactor. Disadvantages of the membrane electrolysis process include the increased electrolysis voltage entailed by the membrane and the use of the membrane itself which is technically problematic (clogging problems), increases process costs and thus complicates commercial application.

DESCRIPTION

It has now been found that spherical nickel hydroxide may be produced by anodic dissolution of nickel directly in a completely intermixed electrolysis cell if the electrolysis brine exhibits comparatively low ammonia contents of 1 to 5 g/l and moreover the chloride ion content, pH value and temperature of the brine are maintained within certain limits.

It is apparently essential to the process according to the invention for a quasi steady-state deposit of basic nickel salt to form on the anode, which clearly assumes the function of a cation exchange membrane, i.e. is impermeable to chloride and hydroxide ions. The anodically dissolved nickel ions collide with the deposit from the anode side and are incorporated therein as basic nickel chloride. Nickel ammonium complexes which have fewer than 4 ligands and are thus relatively unstable, are obviously dissolved from the electrolyte side. Formation of the ammine complex is here apparently favoured by a boundary layer which forms on the electrolyte side of the "membrane" and, in comparison with the brine concentration, has a low OH ion content. On leaving the boundary layer with a low OH ion content, the ammine complexes dissociate before nickel is deposited on the cathode.

The present invention accordingly provides a process for the production of spherical nickel hydroxide by anodic dissolution of a nickel electrode and precipitation of nickel hydroxide in a completely intermixed electrolysis cell, which process is characterised in that that an electrolysis brine is used which has a content of 20 to 50 g/l of chloride ions and 1 to 7 g/l of ammonia with a pH value of 9.5 to 11.5 and a temperature of 45 to 60° C. The molar ratio of chloride ions to ammonia should preferably be from 2 to 10.

Sodium sulfate may additionally be added to the electrolyte in order to dope the product with sulfate.

The electrolysis brine preferably exhibits a pH value of below 11, particularly preferably between 10 and 10.5 (at reaction temperature). The chloride ion concentration is provided by an aqueous solution of alkali metal chlorides. The pH value is established by apportioning an alkali metal hydroxide solution or hydrochloric acid as a function of continuous pH measurement.

According to the invention, a "completely intermixed electrolysis cell" is taken to mean a single electrolysis cell in which the anode and cathode are in contact with substantially the same brine, i.e. in which there is no structural separation of the cell volume into an anode and a cathode compartment by diaphragms or membranes. This disregards the membrane function of the deposits of basic nickel salt formed in situ. According to the invention, "completely intermixed" furthermore means that, with the exception of boundary layer effects in the vicinity of the anode surfaces, the brine itself is of a uniform composition, which is ensured by turbulent intermixing. This is achieved by continuously withdrawing brine from the electrolysis cell by means of a piping system comprising a pump and arranged outside the cell and returning the brine to the cell, i e. the brine is recirculated through the electrolysis cell. The brine recirculation rate is preferably at least 100 times the filling volume of the cell, in particular more than 200 times and particularly preferably 400 to 1000 times the filling volume of the electrolysis cell. The elevated recirculation rate in the cell of at least 20 cm/s ensures that the same brine parameters prevail in the electrolysis cell as in the recirculation circuit outside the cell. The elevated recirculation rate in particular ensures that the increase in temperature of the brine is minimal on a single passage. Temperature control is provided by a heat exchanger arranged in the recirculation circuit outside the cell.

Hydrogen deposited at the cathode is produced as the secondary product of the process and is withdrawn from the cell above the brine. The dispersed hydrogen bubbles provide additional turbulent mixing of the brine.

The average residence time of the brine is for example 3 to 5 hours, i.e. some ⅓ to ⅕ respectively of the filling volume of the cell is discharged from the recirculation circuit each hour, the nickel hydroxide particles are separated from the discharged brine and the brine returned to the recirculation circuit.

The nickel hydroxide particles may be separated by filtration or by using centrifugal forces, for example in a centrifugal decanter. The separated nickel hydroxide is then washed first with completely deionised water, then with dilute, for example 1 molar, sodium hydroxide solution and then again with completely deionised water before subsequently being dried.

Electrolytic dissolution of the nickel is preferably performed at a current density of 500 to 2000 A/m$^2$. Depending upon electrode spacing, the requisite voltage is 2.2 to 4 volts. Anodic faradaic current yield of greater than 98% is achieved.

Doped nickel hydroxide is preferably produced for use in rechargeable alkaline storage batteries. Doping elements which may in particular be considered are cobalt, zinc, cadmium, magnesium, aluminium, copper, chromium, iron, scandium, yttrium, lanthanum, lanthanoids, boron, gallium or manganese. The doping elements are continuously introduced, preferably into the recirculation circuit outside the cell, preferably in the form of the aqueous chlorides thereof, in particular in a quantity ratio relative to the electrolytically dissolved nickel corresponding to the subsequent doping rate. It is furthermore necessary simultaneously to introduce an appropriate quantity of ammonia in order to maintain the ammonia/chloride ratio. Sodium hydroxide solution or hydrochloric acid are added appropriately on the basis of pH value control. In the described process for the production of doped nickel hydroxides, neutral salts are accordingly obtained substantially only in stoichiometric quantities corresponding to the quantity of doping. This formation of neutral salts may also be avoided by additional anodes of the doping metals or by pre-alloying the nickel anode with the doping elements.

According to another embodiment of the invention, doped nickel hydroxides are produced by using nickel anodes alloyed with the doping elements.

Nickel hydroxides coated with cobalt hydroxide are produced according to another embodiment of the invention. To this end, the brine containing nickel hydroxide discharged from the recirculation circuit of the electrolysis cell is preferably introduced into another electrolysis cell having anodes consisting of cobalt. This downstream electrolysis cell, in which the nickel hydroxide is coated with cobalt(II) hydroxide, is operated under substantially identical conditions as the upstream electrolysis cell for producing nickel hydroxide. The ratio of the anode areas (at an identical current density) is here selected such that the desired molar ratio of nickel hydroxide core and cobalt hydroxide coating is produced. Once the brine containing nickel hydroxide particles coated with cobalt hydroxide has been separated from the recirculation circuit of the downstream electrolysis cell with a cobalt anode and the solid particles have been firer removed from the brine, the brine is returned to the first recirculation circuit for the production of the nickel hydroxide.

According to another preferred embodiment of the invention, the nickel hydroxide is discharged from the recirculation circuit of the first electrolysis cell in concentrated form by means of a centrifuge, wherein the smaller nickel hydroxide crystals remain in the returned brine and are returned to the first electrolysis cell. The concentrated suspension containing nickel hydroxide particles is introduced into the substantially separate recirculation circuit of the downstream electrolysis cell with a cobalt electrode. Particularly uniform nickel hydroxide particles may be produced in this manner.

The invention is illustrated in greater detail below by means of FIGS. 1 to 4:

FIG. 4 shows an SEM micrograph of the nickel hydroxide produced according the Example.

Figure 1:
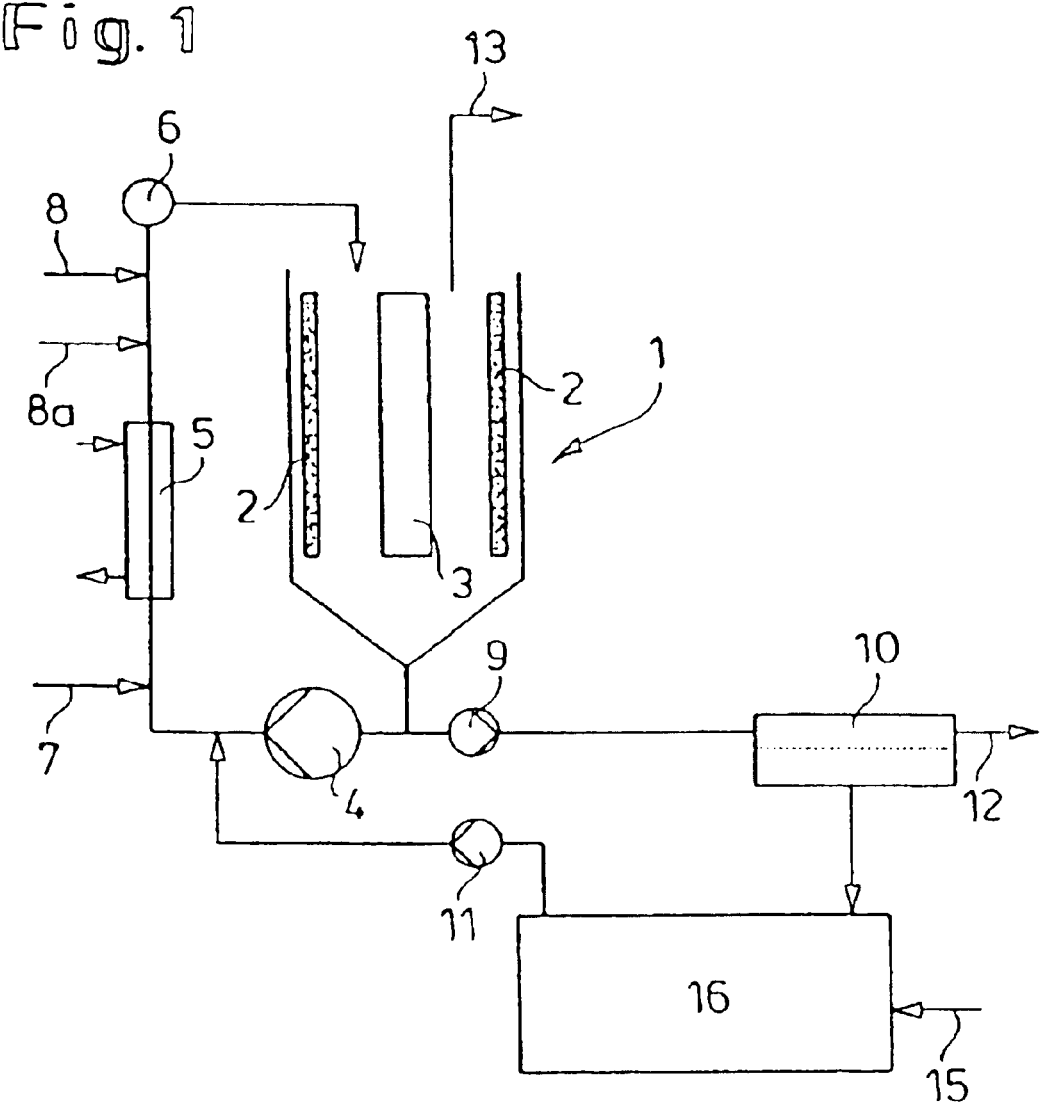
FIG. 1 shows a first embodiment of the invention for the production of doped or undoped nickel hydroxide.

FIG. 1 shows an electrolysis cell 1, which contains a cathode 2 and an anode 3. The electrolysis brine in the bottom of the cell 1 is recirculated via the pump 4, the heat exchanger 5 and the pH probe 6. As indicated by arrow 7, alkali metal hydroxide or hydrochloric acid is apportioned into the recirculation circuit as a function of the pH measurement 6. Nickel hydroxide suspension is discharged from the recirculation circuit by means of pump 9 and passed to the solids separation apparatus 10. As indicated by arrow 12, the solids are discharged The brine, from which the solids have been removed, is returned by means of pump 11 into the recirculation circuit via electrolyte reconditioning 16, optionally with addition of water 15. Moreover, as indicated by arrow 8, an inlet is provided by means of which ammonia losses may be made good. Doping salt solutions may furthermore be introduced into the recirculation circuit via the inlet 8a. According to a preferred embodiment, the separation apparatus 10 assumes the form of a screen centrifuge which is operated such that finely divided nickel hydroxide particles are returned to the recirculation circuit with the filtrate via the pump 11. Gaseous hydrogen produced during electrolysis is withdrawn above the filling volume of the cell, as indicated by arrow 13.

Figure 2:
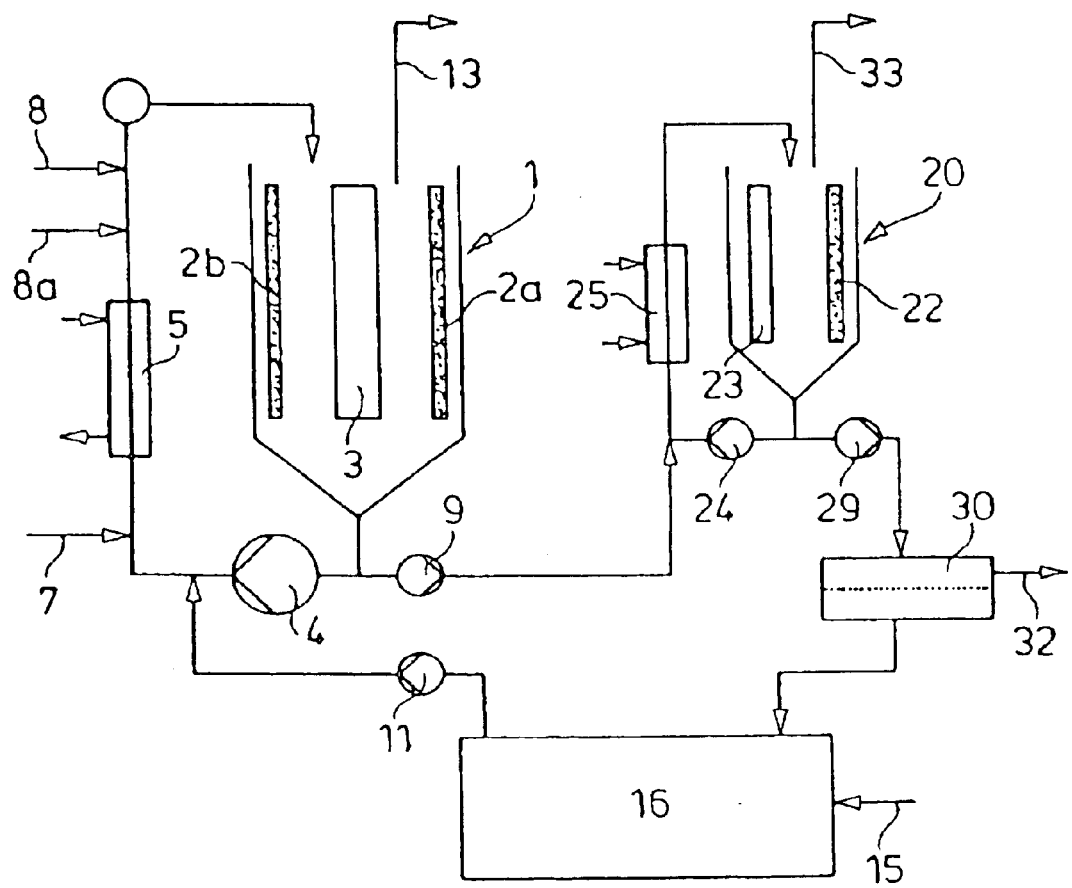
FIG. 2 shows an apparatus according to the invention for the production of nickel hydroxide coated with cobalt hydroxide.

FIG. 2 shows a first electrolysis cell 1 with a nickel anode 3, wherein the same reference numerals otherwise denote the same elements as in FIG. 1. A second electrolysis cell 20 with a cobalt electrode 23 is arranged downstream from electrolysis cell 1. The brine is correspondingly circulated via the pump 24 and heat exchanger 25. The nickel hydroxide suspension discharged via pump 9 from the recirculation circuit of electrolysis cell 1 is introduced into the recirculation circuit. A corresponding quantity of suspension containing nickel hydroxide coated with cobalt hydroxide is discharged via pump 29 and introduced into the evacuating apparatus 30. The filtrate is returned via pump 11 to the recirculation circuit of electrolysis cell 1. The solids separated from the brine are discharged, as indicated by arrow 32, and sent for washing and drying.

Figure 3:
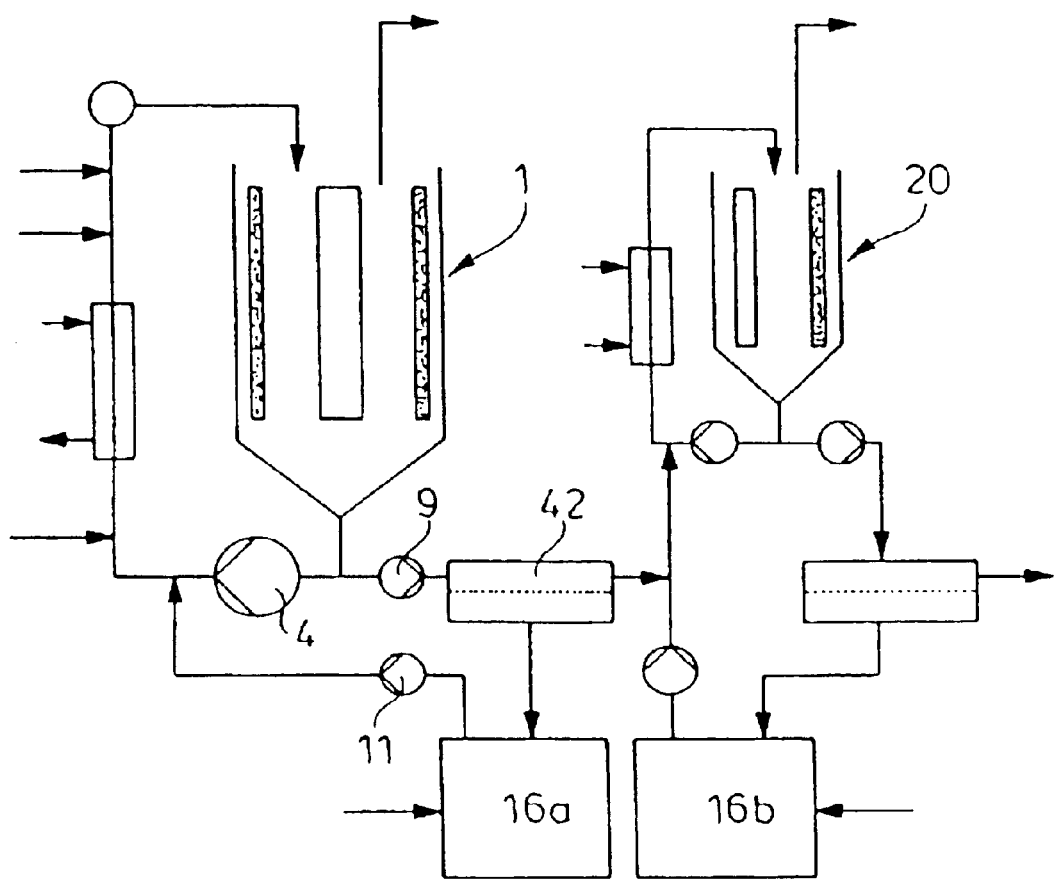
FIG. 3 shows an apparatus according to the invention for the production of coated nickel hydroxide having a particularly uniform particle size distribution.

FIG. 3 shows an embodiment of the invention as in FIG. 2, wherein, however, an additional separating centrifuge 42 is provided, by means of which the brine circuits from electrolysis cells 1 and 20 are separated, wherein only the larger nickel hydroxide particles separated with the separating centrifuge 42 are transferred into the recirculation circuit of electrolysis cell 20 and smaller nickel hydroxide particles are returned to electrolysis cell 1 via the brine of circulating pump 11.

The invention is further described in the following illustrative examples in which all parts and percentages are by weight unless otherwise indicated.

EXAMPLE

An test setup according to FIG. 1 is used. Electrolysis cell 1 has a capacity of 2.3 liters and is equipped with a nickel anode and a nickel cathode, each of an electrode area of 400 $cm^2$. The brine circulated in the recirculation circuit contains 44.6 g/l of sodium chloride and 2.6 g/l of ammonia. 48 g of an aqueous doping solution containing 34 g/l of cobalt and 51.5 g/l of zinc in the form of the chlorides thereof are introduced each hour via feed 8a. The pH value is adjusted to 10.3 at a brine temperature of 55° C. by introducing 1 molar sodium hydroxide solution via feed 7. A steady-state $NH_3$ concentration is maintained by introducing approx. 10 ml/h of $NH_3$ solution (50 g of $NH_3$/l) via feed 8. The current density in the electrolysis cell is 1000 $A/m^2$. 43.8 g of nickel are anodically oxidised each hour. The voltage between the electrodes is approx. 2 volts. The nickel hydroxide discharged at 12 is washed first with completely deionised water, then with 1 molar sodium hydroxide solution and then again with completely deionised water and dried in a circulating air drying cabinet at a temperature of 70° C. The hourly yield is 76 g.

Analysis reveals a product containing 57.5 wt. % of nickel, 1.95 wt. % of cobalt, 2.94 wt. % of zinc, 17 ppm of sodium, 300 ppm of chlorine and having an ammonia content of less than 40 ppm.

The tap density of the product is 2.1 $g/cm^3$, the BET specific surface area 15.6 $m^2/g$ and the average particle size 3.1 $\mu$m (Mastersizer D50).

FIG. 4 shows an SEM micrograph of the spherical nickel hydroxide.

Crystallite size, determined radiographically, is 69 Å, FWHM is 0.92°2θ.

Battery testing to AWTB/$3^{rd}$ discharge cycle reveals a specific capacity of 270 mAh, corresponding to Ni-SES (single-electron-step) utilisation of 103%.

Although the present invention has been described in detail with reference to certain preferred versions thereof, other variations are possible. Therefore, the spirit and scope of the appended claims should not be limited to the description of the versions contained therein.

What is claimed is:

1. A process for producing spherical nickel hydroxide comprising:

(a) subjecting a nickel electrode to anodic dissolution in a completely intermixed electrolysis cell and using an electrolysis brine that is introduced into the cell and that has (i) a chlorine ion content ranging from 20 to 50 g/l (ii) an ammonia content ranging from 1 to 7 g/l of (iii) a pH value ranging from 9.5 to 11.5 and (iv) a temperature of 45 to 60° C.; and (b) precipitating nickel hydroxide.

2. The process according to claim 1, wherein before introducing the electrolysis brine into the electrolysis cell, the pH of the electrolysis brine is adjusted to a value ranging from 10 to 10.5 by addition of alkali metal hydroxide or hydrochloric acid to the brine.

3. The process according to claim 1, wherein the brine has a circulation rate that is at least 20 cm/s.

4. The process according to claim 1, wherein the molar ratio of chloride ions to ammonia is from 2 to 10.

5. The process according to claim 1, wherein the electrolysis brine has an average residence time ranging from 1 to 5 hours.

6. The process according to claim 1, further comprising continuously introducing into the electrolysis cell a doping metal ion selected from the group consisting of Co, Zn, Mg, Cu, Cr, Fe, Sc, Y, La, lanthanoids, B, Ga, Mn, Cd and Al.

7. The process according to claim 6, wherein the doping element ions are produced by anodic oxidation of the corresponding metals.

8. The process according to claim 1, further comprising discharging brine containing dispersed nickel hydroxide powder from the electrolysis cell, separating nickel hydroxide powder and returning the brine to the electrolysis cell.

9. The process according to claim 1, further comprising discharging brine containing dispersed nickel hydroxide powder from the electrolysis cell and introducing the brine containing dispersed nickel hydroxide into a downstream electrolysis cell having a metallic cobalt anode.

10. The process according to claim 9, further comprising discharging brine containing nickel hydroxide powder coated with cobalt hydroxide from the electrolysis call containing metallic cobalt, separating the nickel hydroxide powder and returning the brine to the electrolysis cell.

\* \* \* \* \*